United States Patent [19]

Diery et al.

[11] 4,419,265

[45] Dec. 6, 1983

[54] ADDITION PRODUCTS FROM ETHYLENE OXIDE-PROPYLENE OXIDE BLOCK POLYMERS AND BIS-GLYCIDYL ETHERS, A PROCESS FOR THEIR PREPARATION AND THEIR USE

[75] Inventors: Helmut Diery, Kelkheim; Martin Hille, Liederbach, both of Fed. Rep. of Germany

[73] Assignee: Hoechst Aktiengesellschaft, Fed. Rep. of Germany

[21] Appl. No.: 332,971

[22] Filed: Dec. 21, 1981

[30] Foreign Application Priority Data

Dec. 30, 1980 [DE] Fed. Rep. of Germany ....... 3049455

[51] Int. Cl.$^3$ .................... B01D 17/04; C08L 63/00
[52] U.S. Cl. ................... 252/331; 166/268; 252/8.55 R; 252/319; 252/345; 525/407; 525/523
[58] Field of Search ............... 525/407, 523; 423/456; 252/331, 319, 345

[56] References Cited

U.S. PATENT DOCUMENTS

| | | | |
|---|---|---|---|
| 2,792,357 | 5/1957 | DeGroote | 525/523 |
| 2,864,806 | 12/1958 | DeGroote | 525/523 |
| 3,544,655 | 12/1970 | Booth | 525/523 |
| 3,655,815 | 4/1972 | Salyer | 525/407 |
| 3,687,894 | 9/1972 | Collings | 525/523 |
| 4,125,382 | 11/1978 | O'Brien | 252/331 |
| 4,326,968 | 4/1982 | Blair | 252/331 |
| 4,326,984 | 4/1982 | Blair | 252/331 |

FOREIGN PATENT DOCUMENTS

2054699  2/1981  United Kingdom .

*Primary Examiner*—Paul Lieberman
*Attorney, Agent, or Firm*—Connolly and Hutz

[57] ABSTRACT

Addition products from ethylene oxide-propylene oxide block polymers of the formula $$HO(CH_2CH_2O)_{\overline{m}}(CH_2CHO)_{\overline{p}}(CH_2CH_2O)_nH$$
$$\qquad\qquad\qquad\qquad\;\; |$$
$$\qquad\qquad\qquad\qquad\;\; R$$

wherein R denotes methyl or ethyl, n and m are numbers which are so chosen that the content of polyethylene oxide constitutes 5 to 80% of the molecular weight of the total molecule and p is a number larger than 10, and bis-glycidyl ethers of the formulae $$\underset{O}{\underset{\diagdown\;\diagup}{CH_2-CH}}-CH_2O-\!\!\left\langle\!\!\begin{array}{c}R^1\\ \\R^1\end{array}\!\!\right\rangle\!\!-A-\!\!\left\langle\!\!\begin{array}{c}R^1\\ \\R^1\end{array}\!\!\right\rangle\!\!-OCH_2-\underset{O}{\underset{\diagdown\;\diagup}{CH-CH_2}}$$

or $$\underset{O}{\underset{\diagdown\;\diagup}{CH_2-CH}}-CH_2-O-$$

$$\left[\!\!-\!\!\left\langle\!\!\begin{array}{c}R^1\\ \\R^1\end{array}\!\!\right\rangle\!\!-A-\!\!\left\langle\!\!\begin{array}{c}R^1\\ \\R^1\end{array}\!\!\right\rangle\!\!-O-CH_2CH-CH_2-O\!\!-\!\!\right]_a$$
$$\qquad\qquad\qquad\qquad\qquad\qquad\;\;|$$
$$\qquad\qquad\qquad\qquad\qquad\qquad\; OH$$

$$-\!\!\left\langle\!\!\begin{array}{c}R^1\\ \\R^1\end{array}\!\!\right\rangle\!\!-A-\!\!\left\langle\!\!\begin{array}{c}R^1\\ \\R^1\end{array}\!\!\right\rangle\!\!-O-CH_2-\underset{O}{\underset{\diagdown\;\diagup}{CH-CH_2}}$$

wherein the $R^1$'s can be identical or different and denote hydrogen, $C_1$-$C_4$-alkyl or halogen, in particular chlorine, A denotes a direct bond, a sulfonyl or cyclohexyl group or a group of the formula $$R^2-\underset{|}{\overset{|}{C}}-R^2$$

$R^2$ denotes hydrogen, methyl or phenyl and a denotes an integer from 0 to 10. These addition products are used for breaking petroleum emulsions.

4 Claims, No Drawings

ADDITION PRODUCTS FROM ETHYLENE OXIDE-PROPYLENE OXIDE BLOCK POLYMERS AND BIS-GLYCIDYL ETHERS, A PROCESS FOR THEIR PREPARATION AND THEIR USE

The largest part of all the crude oil extracted is obtained in the form of a water-in-oil emulsion. Virtually pure crude oil is only produced in the initial phase of the life of an oilfield. The water content in crude oil then rises after a certain time, usually beginning with the wells located at the perimeter of the oilfield. Prior to transport, the water must be separated off or lowered below an acceptable concentration. This is usually effected by the addition of small amounts of surfactants, called demulsifiers or emulsion breakers, most crude oils being heated up. Good demulsifiers lower the water content of the crude oil, the oil content of the water separated off and the content of salt and also ash in the crude oil to the values required, whilst being used in the lowest possible concentrations and at low temperatures and also for a short treatment time. Crude oils differ considerably around the world and therefore many types of emulsion breakers are used for achieving optimum demulsifying results. Owing to the large amounts of crude oil emulsions which arise and which have to be processed, there is therefore a considerable interest in improved demulsifiers, because even a small decrease in the processing temperature, the content of salt and water in the crude oil, or the oil content in the water yields significant economic benefits.

The demulsification of crude oils by means of products from a reaction of alkylene oxides with alkylphenol-formaldehyde resins is widely used. Products of this type are disclosed, for example in U.S. Pat. Nos. 2,499,368, 2,499,370, 2,524,889, 2,560,333 and 2,574,543. The next largest group of demulsifiers are block and mixed polymers formed from propylene oxide and ethylene oxide, for example in accordance with French Patent Specification No. 1,069,615 and German Auslegeschrift No. 1,018,179. Effective demulsifiers are also obtained by crosslinking block and mixed polymers formed from propylene oxide and ethylene oxide with one another and with oxyalkylated alkylphenol-formaldehyde resins. Compounds such as phosphorus chlorides, diisocyanates, dicarboxylic acids and phenol-formaldehyde resin structures serve as the crosslinking agent for this purpose.

It has now been found that addition products from ethylene oxide-propylene oxide block polymers and bis-glycidyl ethers yield better demulsification results than the demulsifiers known hitherto.

The invention thus relates to addition products from ethylene oxide-propylene oxide block polymers of the formula

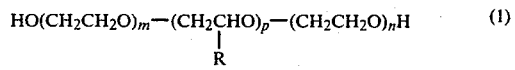

$$HO(CH_2CH_2O)_m-(CH_2CHO)_p-(CH_2CH_2O)_nH \quad (1)$$
$$|$$
$$R$$

wherein R denotes methyl or ethyl, n and m are numbers which are so chosen that the content of polyethylene oxide constitutes 5 to 80% of the molecular weight of the total molecule and p is a number larger than 10, and bis-glycidyl ethers of the formula

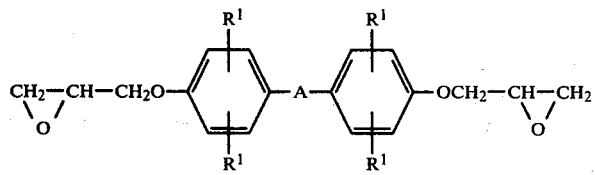

or

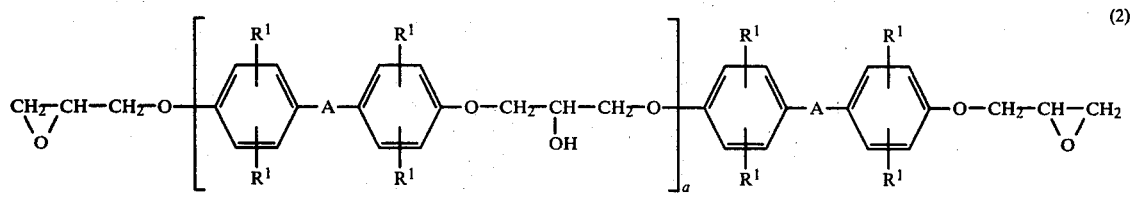

wherein the $R^1$'s can be identical or different and denote hydrogen, $C_1$-$C_4$-alkyl or halogen, in particular chlorine, A denotes a direct bond, a sulfonyl or cyclohexyl group or a group of the formula

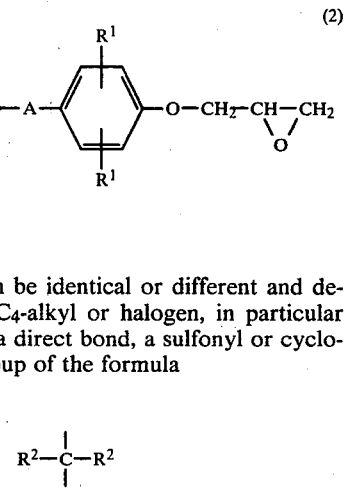

$R^2$ denotes hydrogen, methyl or phenyl and a is an integer from 0 to 10.

The products used as ethylene oxide-propylene oxide block polymers are those which are prepared by oxethylating a polypropylene oxide having a molecular weight of at least 600. The preferred starting product for this preparation is a polypropylene oxide having a molecular weight of 1,000 to 3,500. Some of the propylene oxide can also be replaced by butylene oxide. The content of polyethylene oxide groups in the total molecule of the block polymer is so chosen that it constitutes at least 5%, but preferably 10 to 80%.

The bis-glycidyl ethers are obtained by a known method from the corresponding bisphenols. Inter alia, the following bisphenols are suitable for this purpose: bis-(4-hydroxyphenyl)-methane, bis-(4-hydroxy-3-methylphenyl)-methane, bis-(4-hydroxy-3,5-dichlorophenyl)-methane, 1,1-bis-(4-hydroxyphenyl)-ethane, 2,2-bis-(4-hydroxyphenyl)-propane, 2,2-bis-(4-hydroxy-3-methylphenyl)-propane, 2,2-bis-(4-hydroxy-3-chlorophenyl)-propane, 2,2-bis-(4-hydroxy-3,5-dichlorophenyl)-propane, bis-(4-hydroxyphenyl)-phenylmethane, bis-(4-hydroxyphenyl)-diphenylmethane, 1,1-bis- (4-hydroxyphenyl)-cyclohexane, 4,4'-dihydroxydiphenyl and 4,4'-dihydroxydiphenyl sulfone.

In addition, epoxy resins, in accordance with the formula given above, are also possible bis-glycidyl ethers.

The reaction of the ethylene oxide-propylene oxide block polymers with the bis-glycidyl ethers is effected at temperatures between 70° and 160° C., preferably 80° to 120° C. The reaction is in general carried out without solvents, but it is also possible to carry it out in an inert organic solvent. The molar ratio of the propylene oxide-ethylene oxide block polymers to the bisepoxide is 1:0.6 to 1:1, with the proviso that the ratio of 1:1 is not exceeded because of the occurrence of crosslinking reaction and the associated formation of gelatinous products. Here it can be advantageous to add the total amount of bisepoxide in two to three portions in the course of the reaction. The reaction is carried out in the presence of a catalyst which has an alkaline reaction or of a Lewis acid. If the block polymer still contains, in the form of the neutralized salt, the alkaline catalyst necessary for its preparation, for example sodium hydroxide, potassium hydroxide or sodium methylate, this salt acts as a catalyst for the reaction with the bisepoxide. In this case it is not necessary to make a fresh addition of a catalyst. However, if the block polymer, after its preparation, was freed from the catalyst, a fresh addition of a catalyst of the type mentioned is necessary. The time for the reaction depends on the reaction temperature. The reaction is carried out until an epoxide number of less than 1 to 2 has been reached.

The products thus obtained are very highly suitable for breaking emulsions of water and crude oil. These products are added to the crude oil emulsions in concentrations of 2 to 400, preferably 5 to 50, ppm in an undiluted form or as solutions which have been diluted with an organic solvent in a ratio of up to 1:200.

The examples below are intended to illustrate the invention, "ti" in all cases denoting "internal temperature".

EXAMPLE 1

2953 parts by weight of an ethylene oxide-propylene oxide block polymer having a polypropylene oxide block, which has a molecular weight of about 1800, and 40% of polyethylene oxide in the total molecule which has the trade name Genapol PF 40 ® (average molecular weight 2953 as calculated from the OH number) are introduced into a 2 l stirred vessel having a horseshoe stirrer and an internal thermometer. A bis-glycidyl ether of bisphenol A (having the epoxide number of 197) is then added in an amount of 222.3 parts by weight and the mixture is stirred for a ½ hour at room temperature. The temperature is then raised and the reaction mixture is stirred slowly for 4 hours at ti=110° C. A further 92.6 parts by weight of the bis-glycidyl ether are then added and stirring is continued for 3 hours at 110° C. After the addition of a third amount of 18.5 parts by weight of the bis-glycidyl ether and further stirring for 2 hours at the same temperature, the epoxide number of the mixture has decreased to 1. The reaction mixture is a brown liquid which is readily pourable and has a cloud point of 60°-62° C. (measured in butyldiglycol/water in accordance with DIN 53,917).

EXAMPLE 2

561 parts by weight of an ethylene oxide-propylene oxide block polymer as in Example 1 (Genapol PF 40 ®) (average molecular weight 2805 as calculated from the OH number=40) and 45.1 parts by weight of a bis-glycidyl ether of bisphenol A (molecular weight 376 as calculated from the epoxide number) are introduced into a cylindrical 1 liter flask equipped with a horseshoe stirrer, an internal thermometer and a condenser which has a CaCl$_2$ seal against moisture. After stirring for half an hour at room temperature, the mixture is heated to ti=80° C. After 8 hours a second portion of 18.8 parts by weight of the bis-glycidyl ether is added, and stirring is continued for a further 8 hours at ti=80° C. and then for another 8 hours at ti=110° C. The total reaction time is 24 hours. This lowers the epoxide number of the mixture to <1-2. The cloud point is 64°-65° C. (measured in butyl-diglycol/water in accordance with DIN 53,917).

EXAMPLE 3

(a) In a 2 liter flask having a horseshoe stirrer and an internal thermometer, 0.208 part by weight of BF$_3$ etherate are added to 623.2 parts by weight of a block polymer having a polypropylene oxide block, which has a molecular weight of 1,750, and 40% of polyethylene oxide in the total molecule (trade name Pluriol PE 6400 ®, having a molecular weight of 3,116 as calculated from the OH number) and the mixture is stirred for 15 minutes at room temperature. 67.9 parts by weight of a bis-glycidyl ether of bisphenol A (molecular weight 376) are then added and the mixture is stirred for 10 hours at 120° C. A yellow, clear, medium-viscous liquid is obtained, the epoxide number of which is about 1. The cloud point, measured in accordance with DIN 53,917, is 41° C.

(b) If the reaction is carried out by using 8.2 parts by weight of sodium stearate, instead of boron trifluoride etherate, and by stirring for 15 hours at 140° C., a turbid, reddish-brown reaction product is obtained, which can be filtered hot, with the addition of 10 parts by weight of Celite ®, to give a clear liquid. The cloud point, measured in accordance with DIN 53,917, is 61° C. and the epoxide number is smaller than 1.

EXAMPLE 4

If, in Example 3a, the bis-glycidyl ether of bisphenol A is replaced by 336.8 parts by weight of an epoxide resin (Formula 2 with a=5-6, and having an epoxide number of 39) and stirring is carried out for 28 hours at 120° C., an epoxide number of 4-5 is achieved. Another addition of 0.2 part by weight of boron trifluoride etherate and a further reaction for eight hours at 120° C. lower the epoxide number to below 1. A yellow, highly viscous liquid is obtained. The cloud point, measured in accordance with DIN 53,917, is 45° C.

EXAMPLE 5

On replacing the epoxide resin in Example 4 by 168.4 parts by weight of an epoxide resin having an epoxide number of 77-78 (formula 2 with a=2.4) and stirring for 28 hours at 120° C., with an addition of 0.2 part by weight of boron trifluoride etherate, a clear, yellowish, highly viscous liquid is obtained. The cloud point, measured in accordance with DIN 53,917, is 45° C.

EXAMPLE 6

(a) 975.6 parts by weight of an ethylene oxide-propylene oxide block polymer having a polypropylene oxide block, which has a molecular weight of about 1,600, and 20% of polyethylene oxide in the total molecule (trade name Genapol PF 20 ®) and 89.3 parts by weight of a bis-glycidyl ether of bisphenol A (epoxide number 196) are stirred for 8 hours at 80° C. in a 2 liter flask equipped as in Example 2. A further 37.2 parts by weight of the bis-glycidyl ether are added and the reaction is continued for 8 hours at 80° C. and for 8 hours at 110° C. The liquid reaction product has an epoxide number smaller than 1. The cloud point, measured in accordance with DIN 53,917, is 51° C.

(b) The block polymer used in Example 6a is replaced by 2,301.6 parts by weight of an ethylene oxide-propylene oxide block polymer having 80% of polyethylene oxide in the total molecule (trade name Genapol PF 80 ® and an OH number of 19-20). The reaction time at 110° C. is here extended to 18 hours. The white, waxy reaction product has an epoxide number of about 1. The cloud point, measured in accordance with DIN 53,917, is 90° C.

The products obtained in accordance with Examples 1 to 6b are tested for their demulsifying action on various petroleums. The results have been complied in the following Tables 1 to 3.

In the experiments, the various demulsifiers are used in the form of 50% strength solutions in methanol, that is to say the addition to the emulsions is effected by means of micro-metering devices. The Tables list the percentage amounts of water which have separated off after specified times. The absolute water content was determined by the Dean Rusk method. The individual Tables indicate the quantity of 50% strength methanolic solution of demulsifier used, the demulsification temperature, the absolute water content of the emulsions and their provenance.

TABLE 1

Demulsification temperature: 45° C.
Water content of the emulsion: 63%
Quantity metered in: 35 ppm
Provenance: Ems region (Federal Republic of Germany)

| Example | Minutes | | | | | |
|---|---|---|---|---|---|---|
| | 15 | 30 | 45 | 60 | 100 | 200 |
| 1 | 27 | 53 | 77 | 98 | 100 | 100 |
| 2 | 22 | 50 | 78 | 100 | 100 | 100 |
| 3(a) | 14 | 44 | 63 | 81 | 98 | 100 |
| 3(b) | 19 | 48 | 69 | 86 | 99 | 100 |
| 4 | 12 | 38 | 59 | 77 | 96 | 100 |
| 5 | 13 | 37 | 56 | 75 | 94 | 100 |
| 6(a) | 20 | 48 | 68 | 96 | 100 | 100 |
| 6(b) | 2 | 32 | 48 | 66 | 84 | 96 |

TABLE 2

Demulsification temperature: 32° C.
Water content of the emulsion: 42%
Quantity metered in: 20 ppm
Provenance: Kuwait

| Example | Minutes | | | | | |
|---|---|---|---|---|---|---|
| | 15 | 30 | 45 | 60 | 100 | 200 |
| 1 | 18 | 47 | 77 | 96 | 100 | 100 |
| 2 | 16 | 42 | 73 | 92 | 98 | 100 |
| 3(a) | 8 | 32 | 62 | 84 | 96 | 98 |
| 3(b) | 15 | 36 | 67 | 88 | 95 | 100 |
| 4 | 16 | 35 | 63 | 86 | 96 | 100 |
| 5 | 12 | 38 | 72 | 87 | 92 | 99 |
| 6(a) | 20 | 49 | 78 | 93 | 97 | 100 |
| 6(b) | 8 | 22 | 38 | 67 | 84 | 96 |

TABLE 3

Demulsification temperature: 30° C.
Water content of the emulsion: 48%
Quantity metered in: 40 ppm
Provenance: Libya

| Example | Minutes | | | | | |
|---|---|---|---|---|---|---|
| | 15 | 30 | 45 | 60 | 100 | 200 |
| 1 | 18 | 46 | 88 | 100 | 100 | 100 |
| 2 | 22 | 48 | 82 | 96 | 100 | 100 |
| 3(a) | 10 | 30 | 62 | 74 | 88 | 98 |
| 3(b) | 12 | 38 | 76 | 92 | 98 | 100 |
| 4 | 8 | 34 | 65 | 77 | 90 | 100 |
| 5 | 5 | 28 | 58 | 76 | 88 | 96 |
| 6(a) | 15 | 42 | 79 | 94 | 98 | 100 |
| 6(b) | 5 | 28 | 54 | 72 | 86 | 95 |

We claim:
1. An addition product from the components consisting essentially of (a) an ethylene oxide-propylene oxide block polymer of the formula

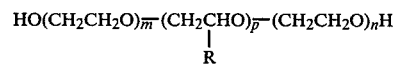

wherein R denotes methyl or ethyl, n and m are numbers which are so chosen that the content of polyethylene oxide constitutes 5 to 80% of the molecular weight of the total molecule and p is a number larger than 10, and (b) a bis-glycidyl ether of the formula

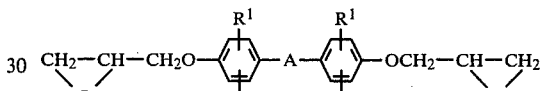

or

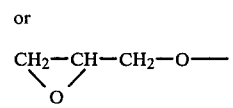

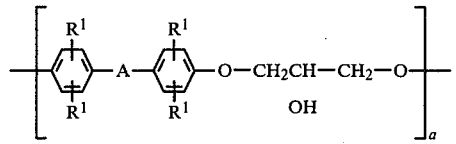

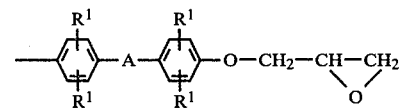

wherein the $R^1$'s can be identical or different and denote hydrogen, $C_1$-$C_4$-alkyl or halogen, A denotes a direct bond, a sulfonyl or cyclohexyl group or a group of the formula

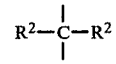

$R^2$ denotes hydrogen, methyl or phenyl and a denotes an integer from 0 to 10.

2. A process for the preparation of addition products as claimed in claim 1, which comprises reacting the ethylene oxide-propylene oxide block polymer with the bis-glycidyl ether at a temperature of 70° to 160° C.

3. An addition product of claim 1, wherein, when a said $R^1$ is halogen, said halogen is chlorine.

4. A method for breaking a petroleum emulsion comprising the step of using an addition product of claim 1 to break the petroleum emulsion.

* * * * *